E. LIGHTFOOT.
COTTON PICKING SPINDLE.
APPLICATION FILED AUG. 10, 1914.

1,245,246.

Patented Nov. 6, 1917.

Witnesses:
S. G. Barrett
E. H. Roessner

Inventor
Exta Lightfoot
By Luther Johns Atty.

UNITED STATES PATENT OFFICE.

EXTA LIGHTFOOT, OF FORT WORTH, TEXAS, ASSIGNOR TO LIGHTFOOT COTTON HARVESTER COMPANY, OF CHICAGO, ILLINOIS, A CORPORATION OF ILLINOIS.

COTTON-PICKING SPINDLE.

1,245,246.  Specification of Letters Patent.  Patented Nov. 6, 1917.

Original application filed April 1, 1914, Serial No. 828,775. Divided and this application filed August 10, 1914. Serial No. 856,000.

*To all whom it may concern:*

Be it known that I, EXTA LIGHTFOOT, a citizen of the United States, now residing in Fort Worth, in the county of Tarrant and State of Texas, have invented certain new and useful Improvements in Cotton-Picking Spindles, of which the following is a specification.

My invention relates to cotton picking spindles and is adapted to be employed in conjunction with suitable mechanisms in gathering cotton from a cotton plant in the field. Its principal objects are to provide a spindle of high picking efficiency, and one well adapted to the removal of cotton therefrom, and one by which cotton may be picked by the spindle and freed therefrom without material injury to the cotton fibers and without objectionably forming them into a compacted, bunched or twisted condition. Other objects will appear hereinafter.

Notable advantages and a specific employment of the construction claimed will more clearly appear from my co-pending application, Serial No. 828,775, on Cotton harvesting machines, filed April 1, 1914, of which this application is a division, and to which reference is made.

In the accompanying drawings, which form a part of this specification, I have illustrated preferred and modified embodiments of these improvements, in which drawings Figure 1 is a broken side view of the preferred form of spindle, only a portion of the picking structure being shown;

Figure 1:
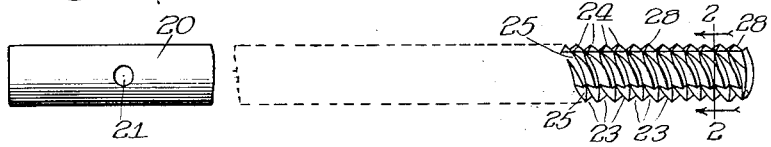
Figure 3:
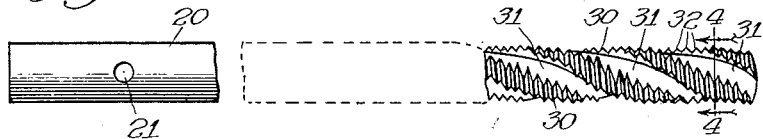
Fig. 3 is a view similar to that of Fig. 1, but showing a modified construction of the picking features.
Figure 7:
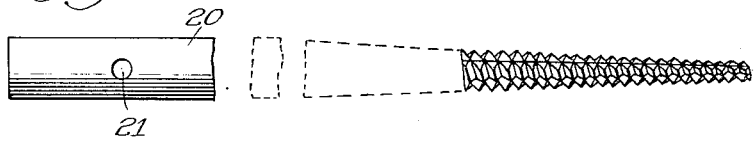
Figure 8:
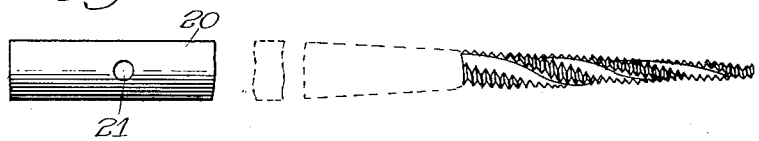

In Fig. 7 the arrangement of the picking points is substantially the same as in Fig. 1;

In Fig. 8 the construction is similar to that of Fig. 3; and

Figure 5:
Fig. 5 is a similar view to that of Fig. 1, but showing another modification.
Figure 9:
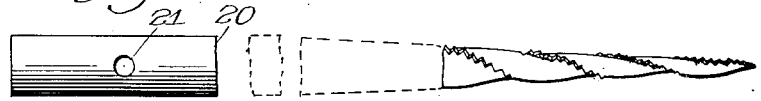

In Fig. 9 the arrangement is that of Fig. 5. The only substantial difference between the devices of Figs. 7, 8 and 9 from those of Figs. 1, 3 and 5 is that the first three spindles illustrated are cylindrical in form, while the last three are tapering, the more longitudinal cuttings of the tapering forms naturally not being substantially parallel, as they preferably are in the cylindrical forms, owing to the gradually increasing diameter of the spindle from the point to the shank portion.

In each of the figures the spindle comprises a metallic rod, preferably steel, of suitable length and diameter. The ones employed by me in the cotton picking machine disclosed in my said co-pending application are substantially five and three-eighths inches long and have, ordinarily, a diameter of one-fourth of an inch. The invention is not limited, however, to length or diameter as these may vary in different kinds of cotton harvesting machines or even in the same machine under slightly modified construction. In the form of spindle I employ and illustrate herewith each is provided with a shank portion 20 substantially one and one-fourth inches long provided with a diametric hole 21 to accommodate a cotter pin for holding the spindle in a suitable axial recess in a rotating element (not shown) whereby the spindle is rotated or twirled on its own axis. Any suitable means may be adopted for securing the spindle to a rotating element on the harvesting machine or for otherwise rotating the spindle.

Each of the spindles illustrated contains a spiral groove on its periphery, and I employ preferably a plurality of such spiral grooves substantially parallel with each other. These grooves preferably extend continuously from the point of the spindle throughout that portion of the same which is exposed to the plants during the cotton picking operation, and in my practice the spiral cuttings extend from the point to the shank portion as 20.

Figure 2:
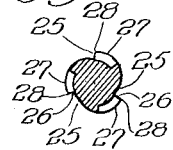
Fig. 2 is a transverse section of the spindle of Fig. 1, as on the line 2—2 thereof.

The preferred shape as well as the preferred cutting of the spindle is shown in Figs. 1 and 2, in which three spiral grooves 23 are cut in the spindle body, presenting intervening ridges 24 having substantially the structure of a screw thread, but having considerable pitch. In the preferred form several, say three, longitudinally disposed grooves 25 are cut substantially transversely of the threads, such longitudinal cutting being on straight lines in the direction of the spindle's length and being preferably slightly undercut at the deepest portions of the grooves, thereby forming transverse undercut faces or facets 26 in the threads or ridges 24 where the longitudinal groove is made, such groove gradually slanting away from its deepest portion, at the facets 26, until the top surface of the ridges is reached, as at 27, where this slanting wall of the groove merges in the crest or apex of the ridge. These undercut faces terminate in sharp points 28, and when the spindle is rotated in picking position with such faces, preferably of triangular outline as shown, moving forward, that is, in such manner that these faces will be presented to the cotton fibers, the fibers are caught and wound upon the spindle. Inasmuch as in the harvesting machine of my said copending application I am employing spindles some of which rotate in one, and others in the opposite direction, in actual practice I provide spindles having right and left grooves and ridges respectively and the undercut faces mentioned are also reversed on some of them so that the same cotton picking action will be had by the spindles having the right and the left construction respectively when operated respectively in clockwise and anti-clockwise direction. All of the spindles illustrated herewith are cut for anti-clockwise picking rotation when viewed in the direction of the respective arrows.

Figure 4:
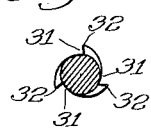
Fig. 4 is a cross section of the spindle of Fig. 3 substantially on the line 4—4 thereof.

In Figs. 3 and 4 I have shown a modified arrangement of the longitudinal cutting of the spindle. The spiral threads 30 are to be understood as being like the threads 24 of Fig. 1, but in Fig. 3 the longitudinal grooves 31 providing the picking facets or points 32 are themselves spirally arranged, in which construction in every position of the spindle on its axis, a plurality of picking facets or points 32 are presented to any given plane at the spindle's side. In Fig. 3 the spiral thread 30 is a single thread instead of three parallel threads as in Fig. 1.

Figure 6:
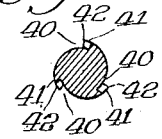
Fig. 6 is a cross section of the spindle of Fig. 5, as on the line 6—6 thereof.

In Figs. 5 and 6 I have illustrated a spindle having a plurality of spiral, preferably undercut, grooves 40 providing spiral ridges 41, and in the faces of these ridges respectively where they are so undercut I provide somewhat sharp points 42, similar to saw teeth, but not necessarily so distinct, these small teeth providing a large number of angular projections from the main body of the ridge adapted to catch the cotton fibers and wind the same upon the spindle.

The spindle construction illustrated and described is highly advantageous both in picking the cotton and in freeing the spindle therefrom, the tendency and actual result in picking being to wind the cotton spirally upon the spindle, and especially where the movement of the spindle is first forward into the cotton plants, as in my harvesting machine to which reference has been made. A very notable advantage however is had when the direction of the spindle is reversed in cleaning, when the spiral construction causes the spindle substantially to unscrew itself from the cotton, the cotton being held by any suitable means, as, for instance, rotating cleaning brushes as disclosed in my said copending application, the picking facets or points receding from the cotton fibers, and no holding action being had by the spiral ridges except some slight incidental friction which is not sufficient to prevent the ready removal of the cotton therefrom. A particular advantage is had in the fact that the cotton fibers are not materially torn in either the picking or unwinding operation, the cotton coming from the brushes in a substantially natural condition, that is, not in a twisted, curled or tightly bunched mass, but being free and open. The tapering construction shown is advantageous both in picking cotton and in releasing the cotton from the spindle, and notably the latter, for when the direction of rotation of the spindle is reversed for cleaning the cotton therefrom the gradually decreasing diameter of the spindle at once loosens the cotton thereon, facilitating its removal by the cleaning brushes or other suitable means.

While in practice the spindle is ordinarily made from rod steel by actually cutting therein the various grooves or other provisions whereby cotton-picking facets or points are formed, the words "cut", "cutting", "undercut," etc., in the claims are not intended to specify a means of forming the grooves, etc., but rather the character of the construction, intersection of grooves, interruptions in the continuity of the ridges, overhanging construction, etc., all as will readily be understood.

In the claims the terms "outward," "outwardly," "outermost," "innermost" and the like are to be understood as meaning relative to the axial line longitudinally through the spindle at the respective places where these terms apply; that is, for instance, "outwardly" will be understood as meaning a direction away from such axial line and toward the periphery.

The invention is not limited to the specific shapes and cuttings of the spindles illustrated, and all changes and modifications therefrom are contemplated by me as fall within the scope of the appended claims.

I claim:

1. A cotton picking spindle having a substantially cylindrical body portion provided with a spiral ridge on the periphery thereof, said spiral ridge being cut at intervals to form an undercut cotton-picking face on such ridge at each place where so cut, said ridge being further so cut away at such intervals as to form thereat a smooth surface relatively long with respect to the depth of said ridge and gradually inclining outward from the axis and away from said face and terminating in the top of the ridge, the construction being such that there is a relatively large open space wider at the outermost portion than at the innermost portion thereof between said face and said opposed inclining surface.

2. A cotton picking spindle having a substantially cylindrical body portion provided with a plurality of substantially parallel spiral ridges, said ridges terminating abruptly at intervals to form substantially cross sectional faces thereon, said faces having respectively a cotton-picking point, there being a smooth surface substantially opposite said faces relatively long with respect to the depth of the faces and providing a substantially clear and free open space in front of the faces whereby cotton fibers may be freely engaged by the portions of the ridges having said faces, said smooth surface gradually inclining outwardly and terminating in the outermost portion of the ridges.

3. A cotton picking spindle having a substantially cylindrical body portion provided with a spiral ridge on the periphery thereof, said spiral ridge being cut at intervals by a plurality of substantially longitudinally disposed undercut grooves, said ridge being thereby provided with a plurality of substantially transverse sectional undercut faces where so cut by said grooves respectively, a wall of each of said grooves gradually inclining outwardly and divergingly from said faces, said faces constituting one wall of the grooves respectively and terminating in the periphery of the ridge substantially at the next succeeding face in said ridge formed by the next succeeding substantially longitudinal groove.

4. A cotton picking spindle having a substantially cylindrical body portion provided with a spiral ridge on the periphery thereof, said spiral ridge being cut at intervals by a longitudinally disposed groove forming cotton-picking tooth-like faces on said ridge.

5. A cotton picking spindle having a substantially cylindrical body portion provided with a plurality of spiral ridges on the periphery thereof, said spiral ridges being cut substantially transversely at intervals by a substantially longitudinally disposed spiral groove, such cutting of said ridges providing cotton-picking points on the ridges where so cut, such points being substantially on the periphery of the ridges.

6. A cotton picking spindle having a substantially cylindrical body portion provided with a plurality of spiral ridges on the periphery thereof, and having a plurality of spiral grooves substantially longitudinally disposed and cutting said ridges substantially transversely, such cutting providing cotton picking points on the peripheries of said ridges where so cut, one wall of each of said spiral grooves inclining outwardly and divergingly so as to merge with the periphery of said ridges respectively.

7. A cotton picking spindle having a screw-like thread on the periphery thereof, said thread being broken at intervals by a substantially V-shaped longitudinally disposed groove, one wall of said groove defining cotton picking points on the periphery of the spiral ridge, the other wall of said groove inclining outwardly away from said first mentioned wall and merging into the peripheries of the ridge whereby said groove is relatively wide at the outermost portion thereof.

8. A cotton picking spindle having a body portion substantially circular in cross section and provided with a plurality of substantially spiral ridges on the periphery thereof, said spiral ridges being of relatively great pitch, said spiral ridges being cut substantially transversely at intervals by a plurality of substantially longitudinally disposed grooves, the cutting of said ridges providing cotton picking points, said points being substantially on the periphery of the ridges, said longitudinal cutting being such that there is a relatively wide open space between the points and the places on the ridges where the walls of the grooves opposite said points meet the peripheries of the ridges.

EXTA LIGHTFOOT.

Witnesses:
C. L. BUTTS,
S. D. WHALEY.